US 12,299,094 B2

(12) United States Patent
Burström et al.

(10) Patent No.: US 12,299,094 B2
(45) Date of Patent: May 13, 2025

(54) SYSTEMS AND METHODS FOR IMPROVED BEHAVIORAL SCORING ACCURACY

(71) Applicant: BEHAVIOSEC INC., San Francisco, CA (US)

(72) Inventors: Per Burström, Luleå (SE); Philip Lindblad, Lidingö (SE); Tony Libell, Luleå (SE); Julian Breitling, Blaustein (DE); Mikael Åhlén, Västerås (SE)

(73) Assignee: LEXISNEXIS RISK SOLUTIONS FL INC., Boca Raton, FL (US)

( * ) Notice: Subject to any disclaimer, the term of this patent is extended or adjusted under 35 U.S.C. 154(b) by 184 days.

(21) Appl. No.: 18/171,793

(22) Filed: Feb. 21, 2023

(65) Prior Publication Data
US 2024/0281507 A1  Aug. 22, 2024

(51) Int. Cl.
| G06F 21/00 | (2013.01) |
| G06F 21/31 | (2013.01) |
| G06F 21/32 | (2013.01) |
| H04L 67/50 | (2022.01) |

(52) U.S. Cl.
CPC ............ *G06F 21/316* (2013.01); *G06F 21/32* (2013.01); *H04L 67/535* (2022.05)

(58) Field of Classification Search
CPC ........ G06F 21/316; G06F 21/32; G06F 21/45; H04L 67/535
See application file for complete search history.

(56) References Cited

U.S. PATENT DOCUMENTS

| 7,207,068 B2 * | 4/2007 | Chaudhari | G06F 21/32 |
| | | | 726/28 |
| 7,403,925 B2 * | 7/2008 | Schlesinger | G06F 21/62 |
| | | | 705/64 |
| 8,869,244 B1 * | 10/2014 | Sundaram | G06F 21/604 |
| | | | 726/4 |
| 9,400,879 B2 * | 7/2016 | Tredoux | G06F 21/316 |
| 9,665,733 B1 * | 5/2017 | Sills | G06F 21/6218 |
| 9,679,162 B2 * | 6/2017 | Jackson | G06F 21/604 |
| 10,530,776 B2 * | 1/2020 | Grant | H04L 63/101 |
| 10,834,097 B2 * | 11/2020 | Ford | G06F 21/604 |

(Continued)

FOREIGN PATENT DOCUMENTS

WO   WO-2021133938 A1 *  7/2021  ........... A61B 5/0002

*Primary Examiner* — Don G Zhao
(74) *Attorney, Agent, or Firm* — TROUTMAN PEPPER LOCKE LLP; James E Schutz; Mark Lehi Jones

(57) ABSTRACT

Systems and methods are provided for improving behavioral biometrics scoring accuracy. A method includes receiving streamed behavioral biometrics data and associated contextual data, determining a first trust score by evaluating the streamed behavioral biometric data, and if the first trust score is below a first predetermined value, separating the streamed behavioral biometrics data into contextualized bins corresponding to the contextual data to produce binned data. The contextualized bins can include a target identifier such as a data field; or a data type field, an area of a browser window, a task, and/or a physical activity. Responsive to a first threshold amount of accrued binned data, the method can include evaluating the binned data to determine a second trust score that is context-aware and sending an alert to the enterprise server responsive to the second trust score being below a second predetermined value.

19 Claims, 11 Drawing Sheets

(56) References Cited

U.S. PATENT DOCUMENTS

| | | | |
|---|---|---|---|
| 10,915,643 B2* | 2/2021 | Ford | H04L 63/1408 |
| 10,922,631 B1* | 2/2021 | Shahidzadeh | H04W 4/029 |
| 10,999,297 B2* | 5/2021 | Ford | H04L 63/20 |
| 11,096,059 B1* | 8/2021 | Shahidzadeh | G06Q 50/10 |
| 11,188,937 B2* | 11/2021 | Gao | H04L 67/535 |
| 11,250,158 B2* | 2/2022 | Ford | G06F 21/6245 |
| 11,252,573 B1* | 2/2022 | Shahidzadeh | H04W 12/68 |
| 11,838,762 B1* | 12/2023 | Shahidzadeh | H04W 12/06 |
| 2004/0193894 A1* | 9/2004 | Chaudhari | G07C 9/37 |
| | | | 713/186 |
| 2010/0115610 A1* | 5/2010 | Tredoux | G06F 21/316 |
| | | | 726/19 |
| 2014/0325220 A1* | 10/2014 | Tunnell | H04L 9/3215 |
| | | | 713/168 |
| 2015/0242621 A1* | 8/2015 | Jackson | G06F 21/6281 |
| | | | 726/17 |
| 2016/0300049 A1* | 10/2016 | Guedalia | G06V 30/1985 |
| 2018/0007053 A1* | 1/2018 | Grant | H04L 63/102 |
| 2019/0354701 A1* | 11/2019 | Ford | H04L 67/535 |
| 2019/0356688 A1* | 11/2019 | Ford | H04L 63/102 |
| 2019/0370854 A1* | 12/2019 | Gao | H04W 4/21 |
| 2019/0387002 A1* | 12/2019 | Ford | H04L 63/1433 |
| 2019/0387003 A1* | 12/2019 | Ford | H04L 63/102 |
| 2020/0051189 A1* | 2/2020 | Williams | H04L 67/535 |
| 2020/0112576 A1* | 4/2020 | Ford | H04L 63/10 |
| 2020/0128048 A1* | 4/2020 | Ford | H04L 67/535 |
| 2021/0084451 A1* | 3/2021 | Williams | H04W 4/38 |
| 2021/0112074 A1 | 4/2021 | Cunningham et al. | |
| 2021/0202067 A1* | 7/2021 | Williams | G06Q 50/265 |
| 2022/0116736 A1* | 4/2022 | Williams | G16H 50/20 |
| 2022/0233102 A1* | 7/2022 | Shelton, IV | G16H 40/60 |
| 2022/0245225 A1* | 8/2022 | Hou | G06F 11/3438 |
| 2022/0335340 A1* | 10/2022 | Moustafa | G06N 20/00 |
| 2023/0007439 A1* | 1/2023 | Williams | G06Q 10/0635 |
| 2023/0021936 A1* | 1/2023 | Ford | G06F 21/57 |
| 2023/0179955 A1* | 6/2023 | Williams | A61B 5/4833 |
| | | | 455/456.1 |
| 2024/0199096 A1* | 6/2024 | Brand | B61L 27/60 |
| 2024/0281507 A1* | 8/2024 | Burström | H04L 67/535 |
| 2024/0346914 A1* | 10/2024 | Wright | G08B 19/00 |

* cited by examiner

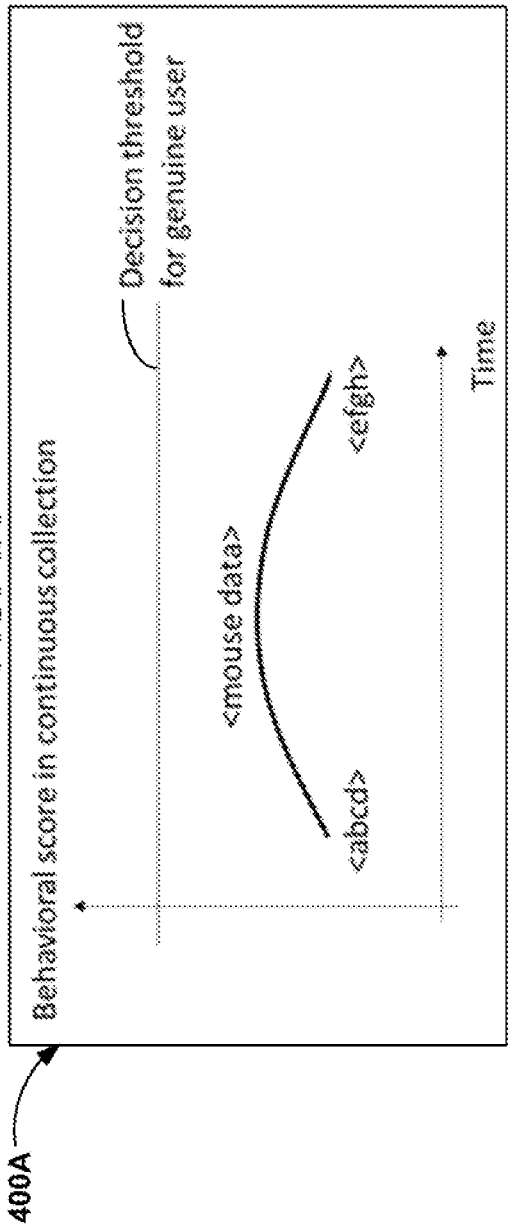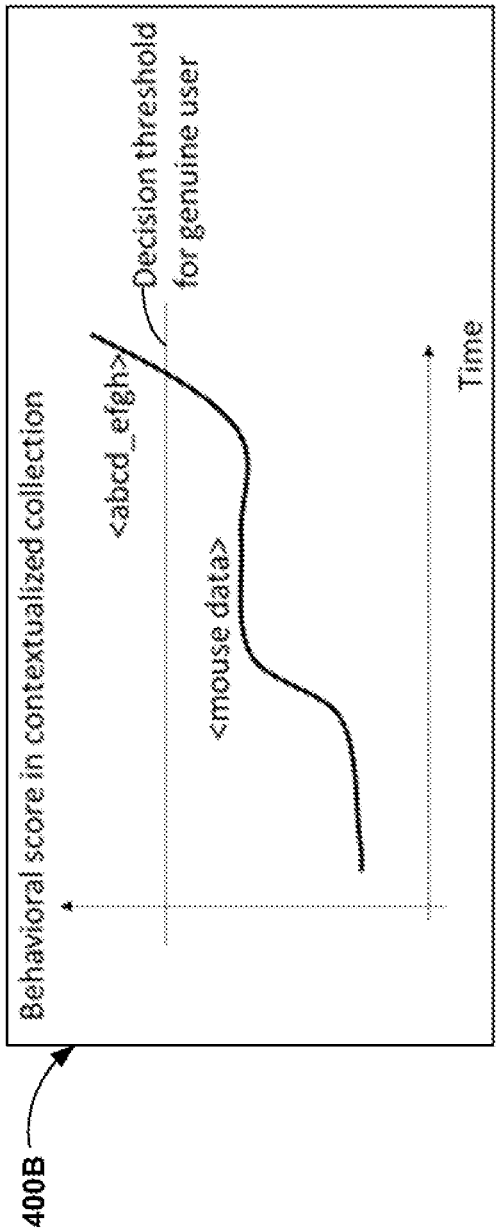

```
1   <!-- login -->
2   <!-- end overview --><div class="section">
3   <div id="overview-container">
4   <h1 class="form-title"><img id="login-logo" src="./img/logo-blue.svg"></h1>
5   <!-- Login Form -->
6   <form method="post" action="/Dashboard/Login">
7   <!-- Disconnected error message -->
8   <!-- Username input -->
9   <input type="text" name="username" placeholder="Username" autofocus="">
10  <!-- Tenant / Tenant Name input-->
11  <input type="text" name="tenantName" placeholder="Tenant Name">
12  <input type="hidden" name="X-Token-Dashboard" value="17D824322EA8C15C6D84D
13  <!-- Password input -->
14  <input type="password" name="password" placeholder="Password">
15  <!-- Login button -->
16  <input type="submit" value="Login">
17  <!-- Login errors-->
18  </form>
19  </div>
20  </div>
```

FIG. 7

SYSTEMS AND METHODS FOR IMPROVED BEHAVIORAL SCORING ACCURACY

FIELD OF THE DISCLOSED TECHNOLOGY

The disclosed technology relates generally to behavioral biometrics, and more particularly to systems and methods for improving the behavioral scoring accuracy by context and by classification of data.

BACKGROUND

Behavioral biometrics provide a way of identifying a user of a service by tying the user's interaction behaviors to previously learned behavior. Such interaction behaviors may be measured to determine how users interact with their communication devices when accessing the service, and comparisons to previous interactions can be used for making sure that the correct user is authenticated for accessing the privileged content, for finding fraudulent use, or for determining other anomalous aspects associated with the use of the service.

A behavioral biometrics service can provide an enhanced layer of security based on a user's typing, timing, keystroke dwell, etc., for example, when the user interacts with a webpage of an enterprise (such as a business, service provider, governmental agency, etc.). Thus, behavioral authentication methods can provide an extra layer of authentication security and can improve the user experience when such methods are seamless and/or non-disruptive.

Traditionally, a user's behavioral interactions with enterprise website pages are collected using browser JavaScript implementations or application SDKs. Behavioral data can be collected from each page and submitted with the normal payload as the user completes the task of that page. The resulting behavioral data may be subdivided into the pages and received by the behavioral biometrics server each time the user activity on the page is completed.

A digital service provider seeking to enable behavioral biometrics of user interactions on its services and pages typically needs to dedicate manpower to different phases of scope setting, integration, testing, and verification, all of which are time-consuming. For example, the specific fields of an application page may need to be monitored with different properties or algorithms, and each page may warrant different settings even different combinations of pages can be scored according to how such activity reflects a normal or abnormal behavior for the user, for example. A set of algorithms that are suitable for monitoring a login page may not be as useful when applied to a transaction page, a password reset page, or a similar feature. Such manual configuration takes time from professional services workers.

Situations can arise when many user interactions need to be collected in a single page/view/window before activity on the page is completed. In such situations, the corresponding behavioral interaction data may not be submitted until a significant time has elapsed after the actions have been performed. In these situations, the use of streaming data may enable a more continuous flow of data to the behavioral service, which in some instances can lead to faster scoring and quicker response times in authentication and fraud mitigation applications. FIG. 1 depicts a conventional behavioral biometrics process that utilizes streamed behavioral data and continuous buffering and scoring of the streamed data. However, since streamed data is continually added and can be stored in running time windows that are individually scored, the division of the data stream may not always be optimum for determining the behavioral score. For example, when keystroke data belonging to a certain type of information, such as a search field, is added to keystroke data of a previously entered field, such as a password field, the resulting combination of keystrokes can provide a worse prediction of an authorized user than if they were separately analyzed.

There is a need for systems and methods that can provide improved accuracy of behavioral scoring using contextualized behavioral data.

BRIEF SUMMARY

Certain exemplary implementations of the disclosed technology may be utilized for improving behavioral biometrics scoring accuracy using contextualized behavioral data.

According to certain embodiments, a method is provided that includes receiving, at a behavioral biometrics server, and responsive to a user accessing a service on an enterprise server, streamed behavioral biometrics data, and contextual data associated with the streamed behavioral biometrics data. The method includes determining a first trust score by evaluating the streamed behavioral biometric data. If the first trust score is below a first predetermined value, the method can include separating the streamed behavioral biometrics data into contextualized bins corresponding to the contextual data to produce binned data. The contextualized bins can include a target identifier such as a data field and/or a data type field. The contextualized bins can correspond to an area of a browser window, a task, and/or a physical activity. Responsive to a first threshold amount of accrued binned data, the method can include evaluating the binned data to determine a second trust score that is context-aware and sending an alert to the enterprise server responsive to the second trust score being below a second predetermined value.

According to certain implementations, a system is provided for improving behavioral biometrics scoring accuracy using streamed data. The system includes a processor and a memory having programming instructions stored thereon, which, when executed by the processor, cause the processor to receive, at a behavioral biometrics server, and responsive to a user accessing a service on an enterprise server, streamed behavioral biometrics data, and contextual data associated with the streamed behavioral biometrics data, determine a first trust score by evaluating the streamed behavioral biometric data. If the first trust score is below a first predetermined value, separating the streamed behavioral biometrics data into contextualized bins corresponding to the contextual data to produce binned data. The contextualized bins can include one or more of a target identifier such as a data field and/or a data type field, an area of a browser window, a task, and/or a physical activity. Responsive to a first threshold amount of accrued binned data, the system may evaluate the binned data to determine a second trust score that is context-aware and send an alert to the enterprise server responsive to the second trust score being below a second predetermined value.

In another exemplary implementation, a non-transitory computer-readable medium is disclosed as having stored thereon software instructions that, when executed by a processor, cause the processor to perform a method of receiving, at a behavioral biometrics server, and responsive to a user accessing a service on an enterprise server, streamed behavioral biometrics data and contextual data associated with the streamed behavioral biometrics data. The method includes determining a first trust score by evaluating the streamed behavioral biometric data and ordering the streamed behavioral biometrics data into contextualized bins corresponding to the contextual data to produce binned data. The contextualized bins can include or correspond to a target identifier such as a data field and/or a data type field. The contextualized bins can correspond to an area of a browser window, a task, and/or a physical activity. Responsive to a first threshold amount of accrued binned data, the method can include evaluating the binned data to determine a second trust score that is context-aware, updating the first trust score with the second trust score, and sending an alert to the enterprise server responsive to the updated first trust score remaining or falling below a predetermined value.

According to certain embodiments, a method is provided for improving behavioral biometrics scoring accuracy using contextualized user journey segments. The method can include receiving, at a behavioral biometrics server, and responsive to a user accessing a service on an enterprise server, user journey interaction data corresponding to the user accessing the service; classifying, with a model pre-trained using multiple journey interactions, the user journey interaction data corresponding to features accessed by the user during user interactions with the service; constructing a timeline with classified user journey interaction data; selecting one or more behavioral algorithms corresponding to classifications of the user journey interaction data in the timeline; evaluating one or more portions of the classified user journey interaction data using the corresponding one or more behavioral algorithms to determine a trust score that is context-aware; and sending an alert to the enterprise server responsive to the trust score being below a predetermined value.

Certain implementations of the disclosed technology will now be described with the aid of the following detailed description and drawings.

BRIEF DESCRIPTION OF THE DRAWINGS

FIG. 4A depicts an example behavioral score over time using the traditional continuous collection and scoring (as illustrated in FIG. 1) for a genuine user interaction corresponding to the example scenario outlined in FIG. 3.

FIG. 4B depicts an example behavioral score over time using the contextualized collection and scoring (as illustrated in FIG. 2) for a genuine user interaction, in accordance with certain exemplary implementations of the disclosed technology and corresponding to the example scenario outlined in FIG. 3. The contextualized collection and scoring can provide a higher confidence that the contextualized data matches the trained profile compared to traditional continuous collection and scoring of streamed data (as depicted in FIG. 4A).

FIG. 7 shows example HTML tags that may be utilized for the login page as depicted in FIG. 6, in accordance with certain exemplary implementations of the disclosed technology.

Figure 1:
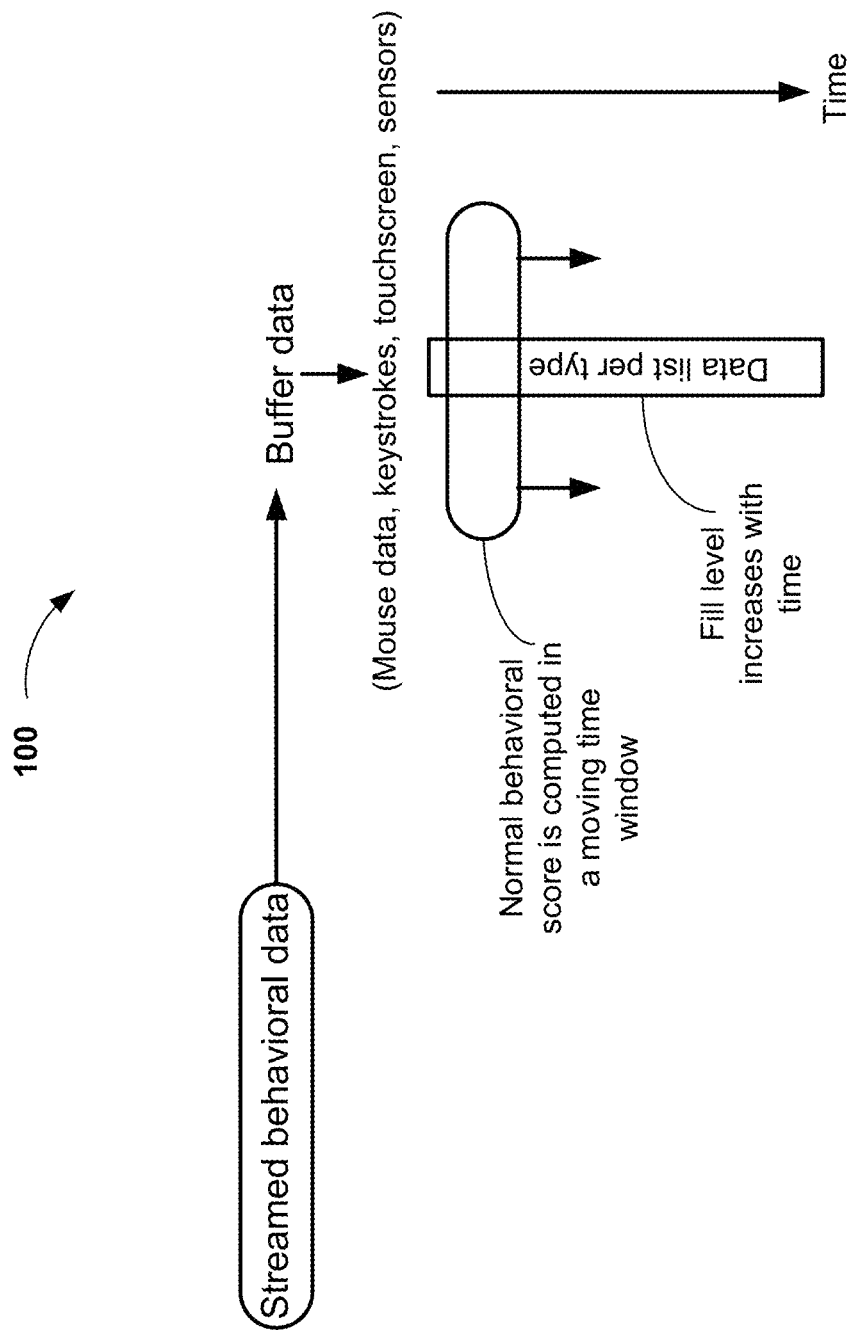
FIG. 1 depicts a traditional streaming architecture in which streamed behavioral data is continually buffered and added to running time windows that are individually scored without regard to context.

The disclosed technology will now be described using the detailed description in conjunction with the drawings and the attached claims.

DETAILED DESCRIPTION

The systems and methods disclosed herein can be utilized to enable enhanced behavioral biometrics scoring using context data. Example methods are disclosed herein for utilizing suitable combinations of behavioral biometrics data elements to improve behavioral data prediction power. Streamed data, for example, may be evaluated for context and binned by certain categories to improve the behavioral biometrics scoring, particularly when contextual parameters are present.

In certain exemplary implementations, the streamed data may be generated by online interactions carried out by a user interacting with an online app or webpage of an enterprise (such as a business, service provider, governmental agency, etc.,) via the user's computing device. Certain exemplary implementations may utilize collector code that resides in the app or webpage opened by users accessing the enterprise service to measure and collect timing data (e.g., from user's typing, timing, keystroke dwell, mouse movement, etc.,) and associated contextual data (e.g., field type, etc.,) that may be utilized to improve the utility and accuracy of certain forms of behavioral biometric scoring.

Certain exemplary implementations of the disclosed technology may be utilized to classify user journeys by monitoring events related to user interactions (typing, scrolling, swiping, submitting, etc.,) with an online app or webpage of an enterprise. Certain exemplary implementations of the disclosed technology may capture and store such user interactions as time series, which may be utilized to improve behavioral biometrics scoring for streamed real-time data. Certain exemplary implementations of the disclosed technology may enable behavioral scoring over a long time period.

Certain exemplary implementations of the disclosed technology may enable a behavioral biometrics service to utilize user interactions via interaction data that is collected. For example, behavioral and contextual data collected on a first "page" or part of a session during a first time period may be sent to a behavioral biometrics server along with the submission of page payload data after all relevant data has been collected. In accordance with certain exemplary implementations of the disclosed technology, the context to which each behavioral data belongs may be exploited to enhance a behavioral score.

For continuous monitoring, where a user session has a long duration, (such as hours or days) the associated data may be less likely to belong to a specific context or type but can instead be interspersed to a much larger extent. In this type of use case, the behavioral and contextual data may be streamed and buffered to the behavioral biometrics server as users interact with the service. In some exemplary implementations, collection and/or streaming of the behavioral and contextual data can be handled under certain schedules and/or periodicity.

In certain exemplary implementations, the behavioral score (such as a user trust score) may be updated continuously as new interaction data arrives to determine a user trust level using context that can provide better overall accuracy of the user trust level. In this respect, the user trust level may be considered a time-filtered behavioral score. In certain exemplary implementations, filtering parameters may be chosen so that the trust score drops quickly enough to capture a fraudulent actor while being slow enough to not produce a false alarm from the slightest mistyping or erratic movement of the genuine user. While this construction of user trust can be sufficient in a majority of interactions, for some data, such as keystroke and/or keyflight data, the disclosed technology may provide much stronger prediction power when the context is considered.

An individual keystroke can have a time duration during which it is held down, but this in itself may be too little information for a behavioral algorithm to predict a trust score. To also utilize the time until the next key or keys are registered, the associated timing data for several keys pressed in succession may be stored and analyzed, which can improve the behavioral scoring substantially. Having such data from multiple characters can enable evaluating bi- and trigrams and larger groups of keys together, however, if a user types a first name in a first field and a last name in a second field, the behavioral scoring may be different compared to a scenario where a user enters both first and last name into a single field. To further illustrate this problem, when keystroke data belonging to a certain type of information, such as an amount field, is added to keystroke data of a previous field, the resulting combination of keystrokes may have low prediction power, particularly when there is a pause (due to some other user activity) between entries. In accordance with certain exemplary implementations of the disclosed technology, additional improvements can be gained by utilizing the context from where the data was input.

In accordance with certain exemplary implementations of the disclosed technology, keystrokes and other interaction data with associated context may be recorded and analyzed to enhance a running behavioral score with a weighting, such that when data with more prediction power is recorded, it may be used to modify the trust value.

In certain implementations, streamed keystrokes may be ordered into contextualized bins where each bin is one or more of, but not limited to, a target identifier, an area of the screen or window, a task to be done, or a physical activity being performed while accessing a service.

Various implementations of the disclosed technology may be utilized to improve the accuracy of certain behavioral biometrics systems, such as discussed in U.S. Pat. No. 10,068,076 entitled "Behavioral authentication system using a behavior server for authentication of multiple users based on their behavior," which is incorporated by reference herein as if presented in full.

Various implementations of the disclosed technology may be utilized to improve the accuracy of certain behavioral biometrics systems, such as discussed in U.S. Pat. No. 9,542,541 entitled "Method, computer program and system that uses behavioral biometric algorithms," which is incorporated by reference herein as if presented in full.

Various implementations of the disclosed technology may be utilized to improve the accuracy of certain behavioral biometrics systems, such as discussed in U.S. Pat. No. 10,068,088 entitled "System and method for distinguishing human swipe input sequence behavior," which is incorporated by reference herein as if presented in full.

Various implementations of the disclosed technology may be utilized to improve the accuracy of certain behavioral biometrics systems, such as discussed in U.S. Pat. No. 10,0437,971 entitled "Secure authentication of a user of a device during a session with a connected server," which is incorporated by reference herein as if presented in full.

Various implementations of the disclosed technology may be utilized to improve the accuracy of certain behavioral biometrics systems, such as discussed in U.S. Pat. No. 9,831,710 entitled "Behavioral authentication system using a biometric fingerprint sensor and user behavior for authentication," which is incorporated by reference herein as if presented in full.

Various implementations of the disclosed technology may be utilized to improve the accuracy of certain behavioral biometrics systems, such as discussed in U.S. Pat. No. 10,440,019 entitled "Method, computer program, and system for identifying multiple users based on their behavior," which is incorporated by reference herein as if presented in full.

As discussed above, FIG. 1 depicts a traditional streaming architecture/method 100 in which streamed behavioral data is continually buffered and added to a running time window that is individually scored without regard to context, which can result in inaccurate behaviometric predictions. The disclosed technology may be utilized to improve the accuracy of behaviometric predictions by using context. Certain embodiments of the disclosed technology will become clearer in view of the following description of the drawings and may be utilized to improve the behavioral/behaviometric scoring accuracy.

Figure 2:
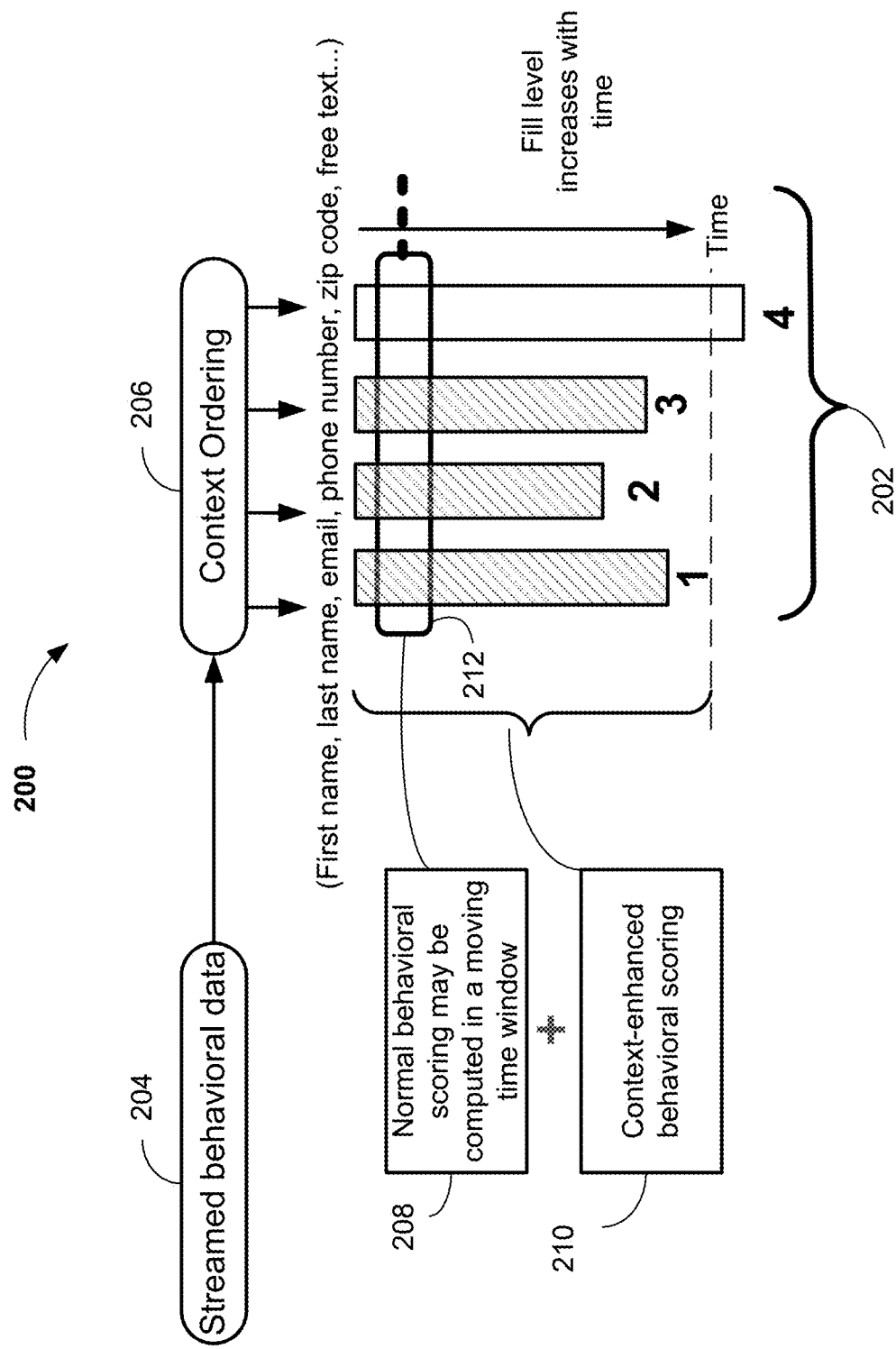
FIG. 2 depicts an example architecture in which contextualized bins may be utilized for improved behavioral scoring accuracy, in accordance with certain exemplary implementations of the disclosed technology.

FIG. 2 depicts an example architecture/method 200 in which contextualized bins 202 may be utilized for improved behavioral scoring accuracy, in accordance with certain exemplary implementations of the disclosed technology. The contextualized bins 202, for example, may correspond to separate categories of user input field types and/or field data present in the streamed data. For example, contextualized bins 202 may include separate bins for user input field types such as first name, last name, email, phone number, zip code, free text, etc. In certain exemplary implementations, streamed behavioral data 204 may undergo a context ordering/sorting/joining process 206 for being added to the appropriate contextualized bin(s) 202. In certain exemplary implementations, the contextualized bins may alternatively or additionally correspond to a target identifier, an area of the screen or window, a task to be done, or a physical activity being performed while accessing a service.

In certain exemplary implementations, a normal (moving time window 212) behavioral scoring 208 may be performed. In accordance with certain exemplary implementations of the disclosed technology, when contextual parameters are present, a context-enhanced behavioral scoring 210 may be computed, for example, using the streamed behavioral data 204 ordered/sorted 206 by context and added to the contextualized bin(s) 202. In accordance with certain exemplary implementations of the disclosed technology, streamed behavioral data 204 may be continually added to the bins 202 and can be stored in running time windows 212 that may be individually scored 208. In certain exemplary implementations, the context-enhanced behavioral scoring 210 may be used to replace the normal behavioral scoring 208, for example, to improve the scoring accuracy by utilizing the context.

In accordance with certain exemplary implementations of the disclosed technology, keystroke times 308 and/or keyflight times 310 may be monitored and utilized for the behavioral scoring. The term "keystroke" as defined herein may refer to the metrics used to quantify the timings of up/down movements and hold time of a key pressed on a keyboard or touchscreen. The term "keyflight" may refer to the timing data that may be collected between two keystrokes (e.g., bigram). Specifically, keyflights may be uniquely identifiable, for example, between keys A to B, and may be treated differently than keyflights between keys A to C or B to A. Trigrams and other groups may be treated similarly. In certain exemplary implementations, his keystroke and/or keyflight data may be stored individually for each character in the set and/or groups of characters.

Figure 3:
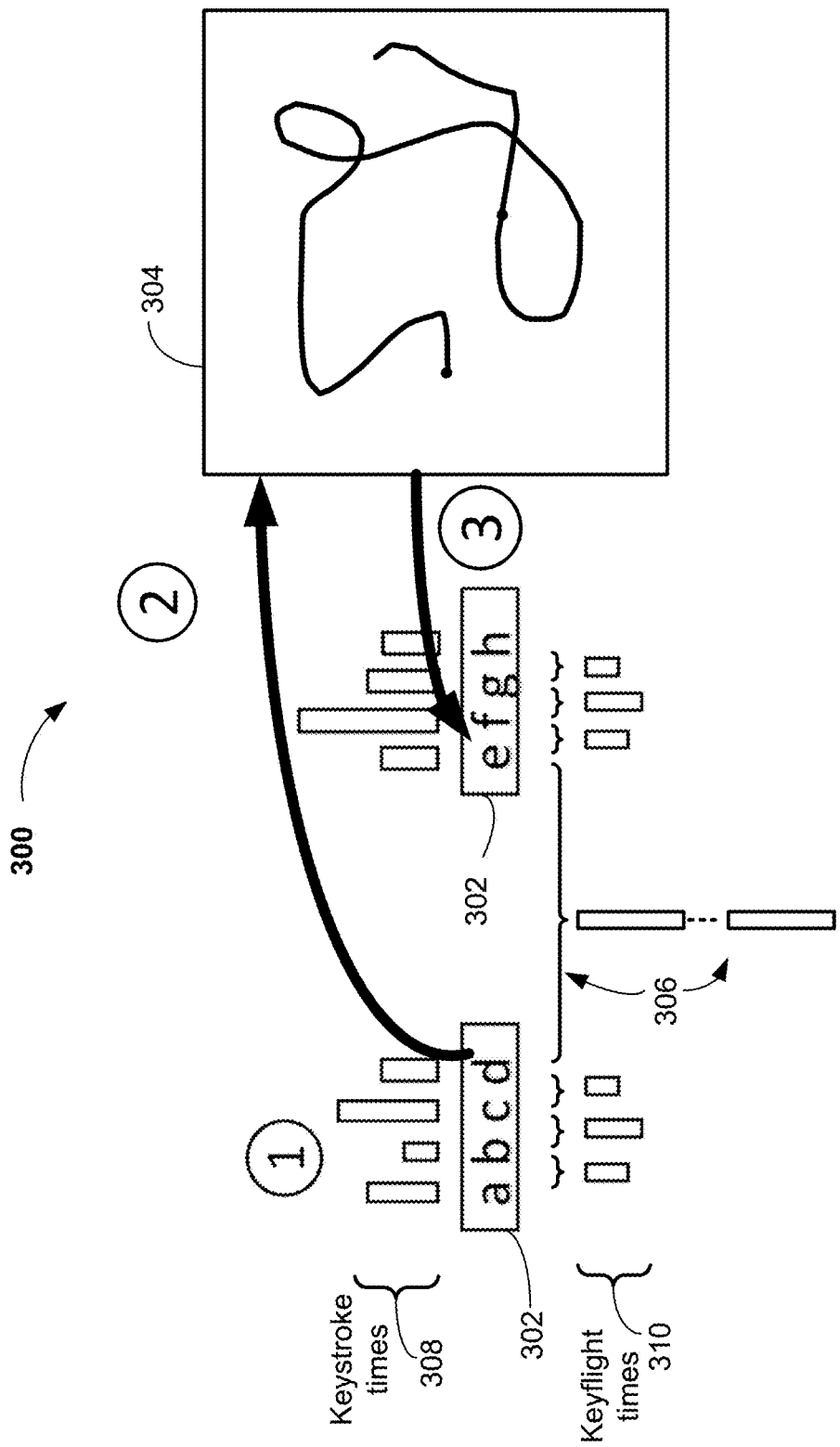
FIG. 3 depicts an example scenario involving two text entry tasks that are separated by time, where a user enters text in an entry field, then switches tasks to interact with a mouse or touchpad, and then returns to enter more text in the entry field, and for which the disclosed technology can provide certain improvements in behavioral scoring accuracy.

FIG. 3 depicts an example scenario 300 where a user (1) enters text in an entry field 302, then (2) switches tasks to interact with a mouse 304 (or touchpad), and then returns to enter more text in the same entry field 302. In accordance with certain exemplary implementations of the disclosed technology, the entry of the characters in the entry field 302 can have associated keystroke times 308 and keyflight times 310 that may provide behaviometric data for behavioral scoring. However, the "pause" 306 between these two typing sequences may be arbitrarily long, which may be difficult for traditional continuous behavioral scoring to process data and/or compute an accurate behavioral score without perceiving that the two text entry tasks in the same entry field 302 (and separated by time) can be considered a single stream of typing data. Certain exemplary implementations of the disclosed technology may utilize contextual information regarding the field type(s) and associated interactions in the user journey to contextually order the behavioral information into contextual bins (as depicted in FIG. 2) to provide context-enhanced behavioral scoring.

FIG. 4A depicts an example behavioral scoring 400A over time using a traditional continuous collection and scoring method for a genuine user interaction corresponding to the example scenario outlined in FIG. 3. As illustrated, a behavioral score may initially rise with the entry of the first set of data, but without context, the score may drop and remain below a decision threshold, which could indicate a genuine user for a score above the threshold.

FIG. 4B, in contrast, depicts an example behavioral scoring 400B over time using contextualized collection and scoring for a genuine user interaction, in accordance with certain exemplary implementations of the disclosed technology and corresponding to the example scenario outlined in FIG. 3. As illustrated, fusing and evaluating the behavioral elements by context can provide a higher confidence that the contextualized data matches the trained profile compared to traditional continuous collection and scoring of streamed data (as depicted in FIG. 4A).

Figure 5:
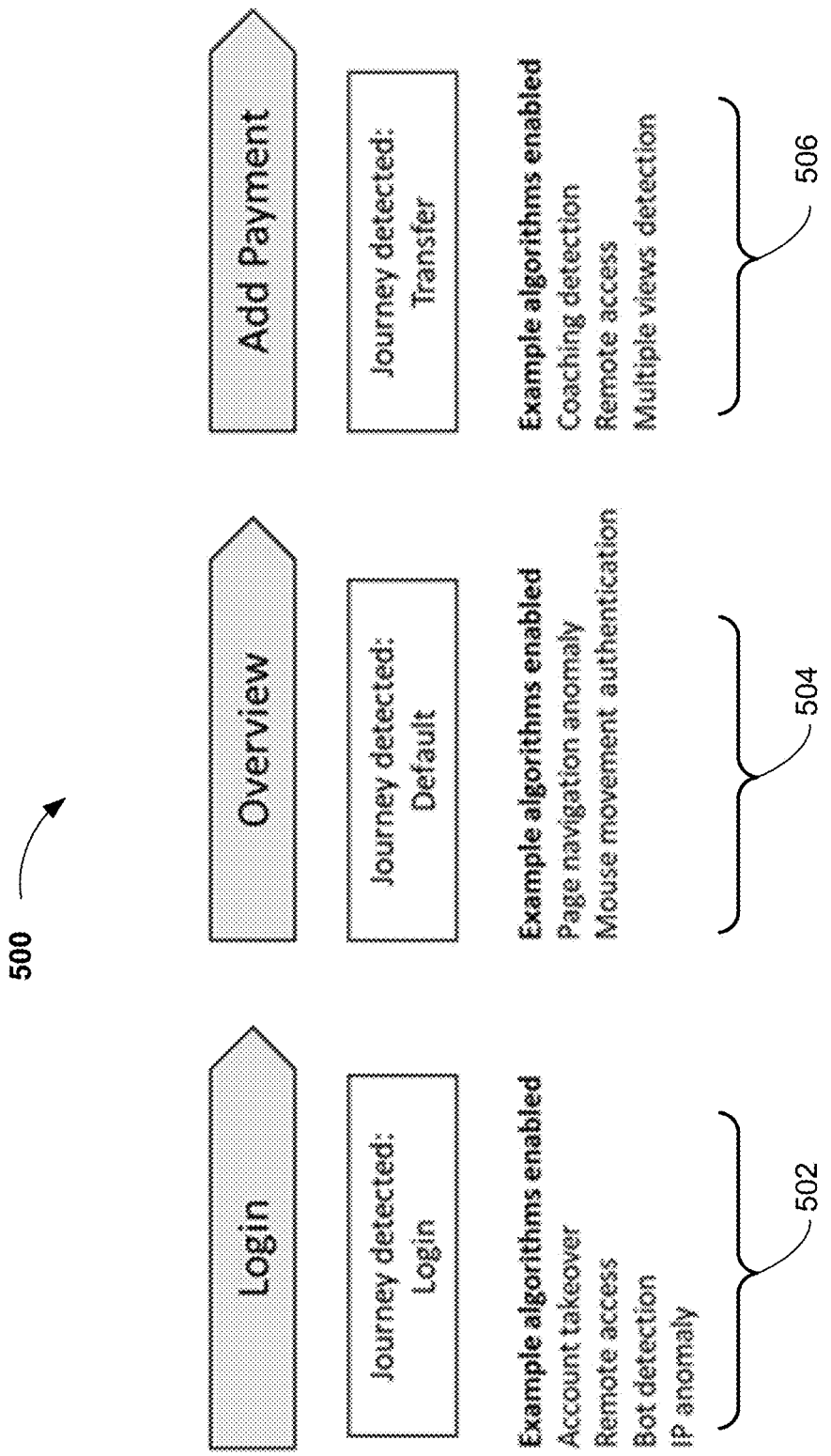
FIG. 5 depicts contextualized journey segments that may be detected to enable appropriate algorithms for behavioral biometrics monitoring, in accordance with certain exemplary implementations of the disclosed technology.

FIG. 5 depicts additional example scenarios 500 in which contextualized journey segments 502 504 506 may be detected to enable appropriate algorithms for behavioral biometrics monitoring, in accordance with certain exemplary implementations of the disclosed technology. Certain example implementation of the disclosed technology may include classifying user journeys in a pre-deployment analysis phase, for example, where events related to user interactions with the pages (such as typing, scrolling, swiping, submitting, etc.) provided by a service may be stored as fixed length time-series.

In accordance with certain exemplary implementations of the disclosed technology, certain behavioral biometrics algorithms may be automatically adapted to fit the different views/pages that a plurality of users access during interactions with a digital service, such as a banking service or some other type of enterprise service. In certain exemplary implementations, the adaptation of the algorithms may be facilitated by the detection and matching of events and processes relating to navigating the different views that are common for users of existing pre-trained templates of how such journeys are undertaken. Accordingly, specific journey segments, such as a login view 502, page navigation 504, a transaction view 506, etc., for example, may be automatically classified, which may help reduce integration times and complexity, enabling more of a plug-and-play experience. While some implementations of the disclosed technology may be used for a single service provider's users, certain implementations of the disclosed technology may enable use over multiple service providers, with different pages.

Certain exemplary implementations of the disclosed technology may be utilized to adapt or select a behaviometric algorithm according to the particular segment of the user journey. For example, as illustrated in FIG. 5, when a login attempt is detected, such as during a login segment 502 of a user journey, one or more appropriate algorithms may be selected and used to detect and/or score associated indicators such as an account takeover, remote access, bot detection, some of internet protocol anomaly, etc. Similarly, when an interaction with a webpage interaction is detected, such as during an overview segment 504 of a user journey, one or more appropriate (and possibly different) algorithms may be selected and used to detect and/or score associated indicators such as a page navigation anomaly, or a mouse movement anomaly or authentication. To continue the example, an interaction with a transaction attempt is detected, such as during a payment segment 506 of a user journey, one or more appropriate (and possibly different) algorithms may be selected and used to detect and/or score associated indicators such as coaching, remote access, multiple page views open, etc.

Figure 6:
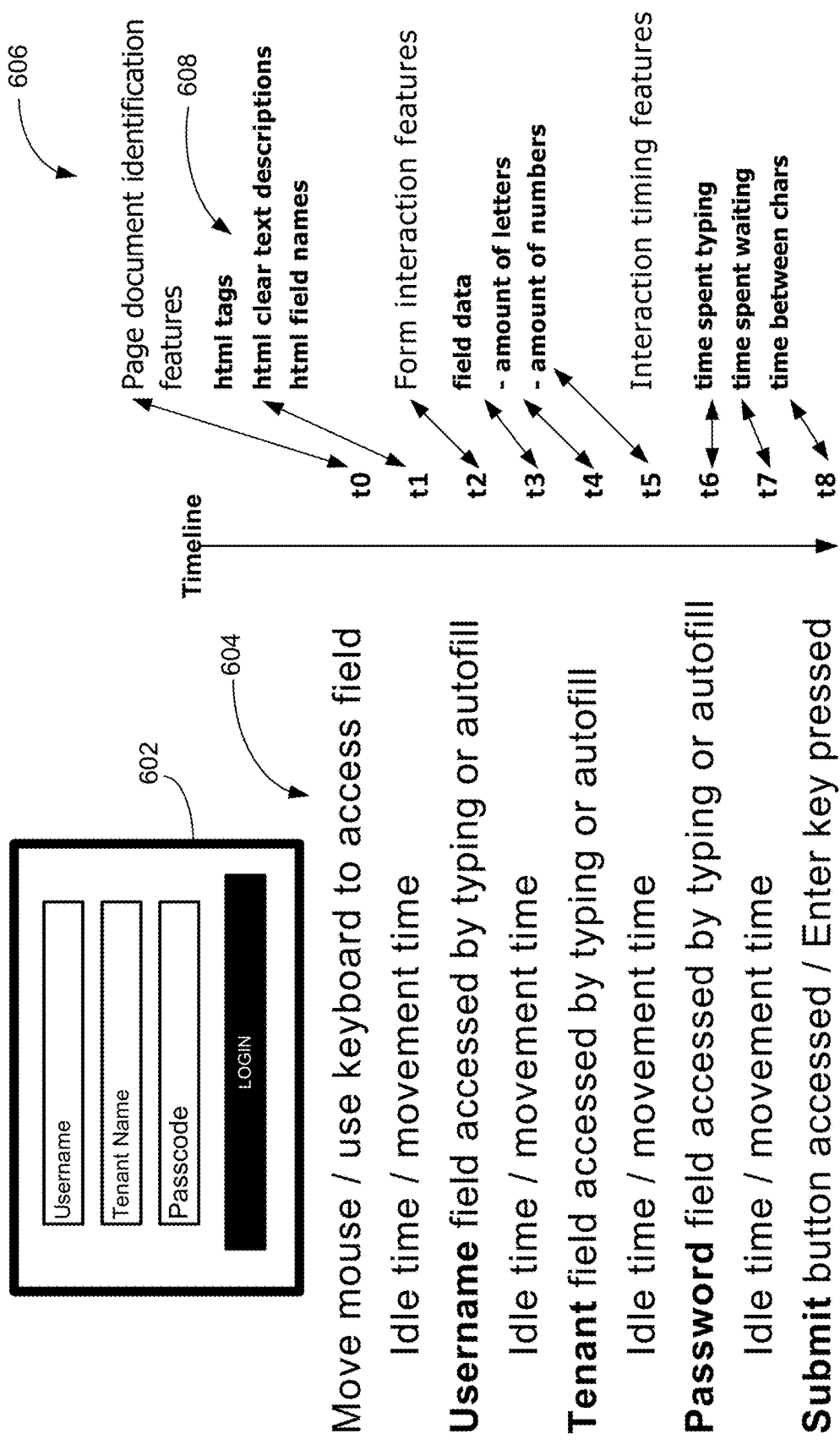
FIG. 6 depicts certain example features that may be used for a login page, in accordance with certain exemplary implementations of the disclosed technology.

Certain exemplary implementations of the disclosed technology can include a training phase and a classification phase. For example, in the training phase, certain feature vectors describing user journeys may be extracted from received pages traversed by multiple users on multiple sites. Such data from multiple sites/multiple users may be used for training to enable a classification for handling interaction data from a new, previously unseen site, regardless of the exact design and implementation choices. In certain exemplary implementations, the feature vectors may be fed into one or several clustering algorithms to achieve a partitioning of data such that journeys having a high feature similarity may be placed in the same group. By the choice of feature vectors and by using clustering, the underlying data may be categorized into functional groups of the same journeys, as illustrated in FIG. 6. In certain exemplary implementations, certain features of the feature vectors may be chosen to describe the uniqueness of the page and the user actions undertaken on the page.

FIG. 6 depicts an example login page form 602 for which certain associate features 604 may be monitored and added to a timeline 600 in accordance with certain exemplary implementations of the disclosed technology.

FIG. 7 depicts example HTML tags 700 that may correspond to the login page form 602 as depicted in FIG. 6.

Returning to FIG. 6, and in accordance with certain exemplary implementations of the disclosed technology, a first set of features may be derived from the information in the login page form 602 itself may be added to the timeline 606. For example, as illustrated in the timeline 606, certain HTML elements 608 related to the login page form 602 may be extracted (for example, from the HTML tags 700 as illustrated in FIG. 7) and added to the timeline 608. To label such page information, a bag of words model (or any standard document classification method may be used). In certain exemplary implementations, the page elements may be labeled in cleartext or scrambled or hashed, such that the labels are not accessible, in which case the ordering, locations, sizes, and occurrence of the elements can be used instead.

In accordance with certain exemplary implementations of the disclosed technology, an output from a first model that classifies text fields may be used as input for the timeline 606. Accordingly, different sites can have different designs and choices for how to navigate such a login sequence, such that only a username form is shown in a first view, then after an existing username has been input, the view may change to a password form, then a two-factor-authentication form, etc. In accordance with certain exemplary implementations of the disclosed technology, the features may be selected across all pages such that a multi-view sequence automatically can be matched against a single-view, multi-field login sequence.

As discussed in detail above, a second set of features involving behaviometric data such as keypress times, keyflight times, rollover times, the proportion of digits to letters, pauses, etc., can be extracted and utilized based on interactions with the forms, pages, functions, etc., of a user journey.

In accordance with certain exemplary implementations of the disclosed technology, a third set of features such as timing and ordering of elements of how the user navigates the elements of the page, and fields accessed, may be extracted and utilized based on interactions with the forms, pages, functions, etc., of a user journey.

As a specific use case example, a classification of a feature set associated with a payment transaction may include one or more of a date selector, a recipient list, a field for manual input of details (such as an amount entered, comment, etc.,), a submit element, etc. In certain exemplary implementations, timings associated with user interactions in the various fields/features (and/or navigations between fields/features) may be captured via collector code. In accordance with certain exemplary implementations of the disclosed technology, the features, and associated timings can be captured and placed in one or more time series. In certain exemplary implementations, the time series may be normalized into a fixed length vector in the feature space, which means that any other type of user action (such as a login) may have low or zero matching with this type of normalized event time series.

According to an exemplary implementation of the disclosed technology, and similar to the binning process illustrated in FIG. 2, different user journeys and/or segments may be bucketed or binned into the functional groups, such as for the user journey sequences discussed above with respect to FIG. 5, which can include (but are not limited to) a login sequence 502, a page interaction and/or browsing sequence 504, a transaction sequence 506 (such as a transfer, an adding of a new payee, a security token setup), etc. In accordance with certain exemplary implementations of the disclosed technology, the features may be anonymized or actively selected to not capture user-specific behavior, which is the typical modus operandi of normal behavioral biometrics. In this respect, a model using such anonymized user journeys and/or segments may be trained (for example, using a feature training module) by utilizing many different user interactions over many different sessions using many different enterprise servers.

In accordance with certain exemplary implementations of the disclosed technology, when a new user journey is to be evaluated, i.e., when the classification phase ensues, certain implementations of a model may classify new journey feature vectors by comparing them to the created centroids of the functional groups using a statistical distance metric. Once the functional group for data from a field is established, the correct behavioral algorithms may be chosen to match against the existing profile(s). Furthermore, certain implementations of the disclosed technology may draw upon existing methods for document classification, such as utilization in support vector machines.

Figure 8:
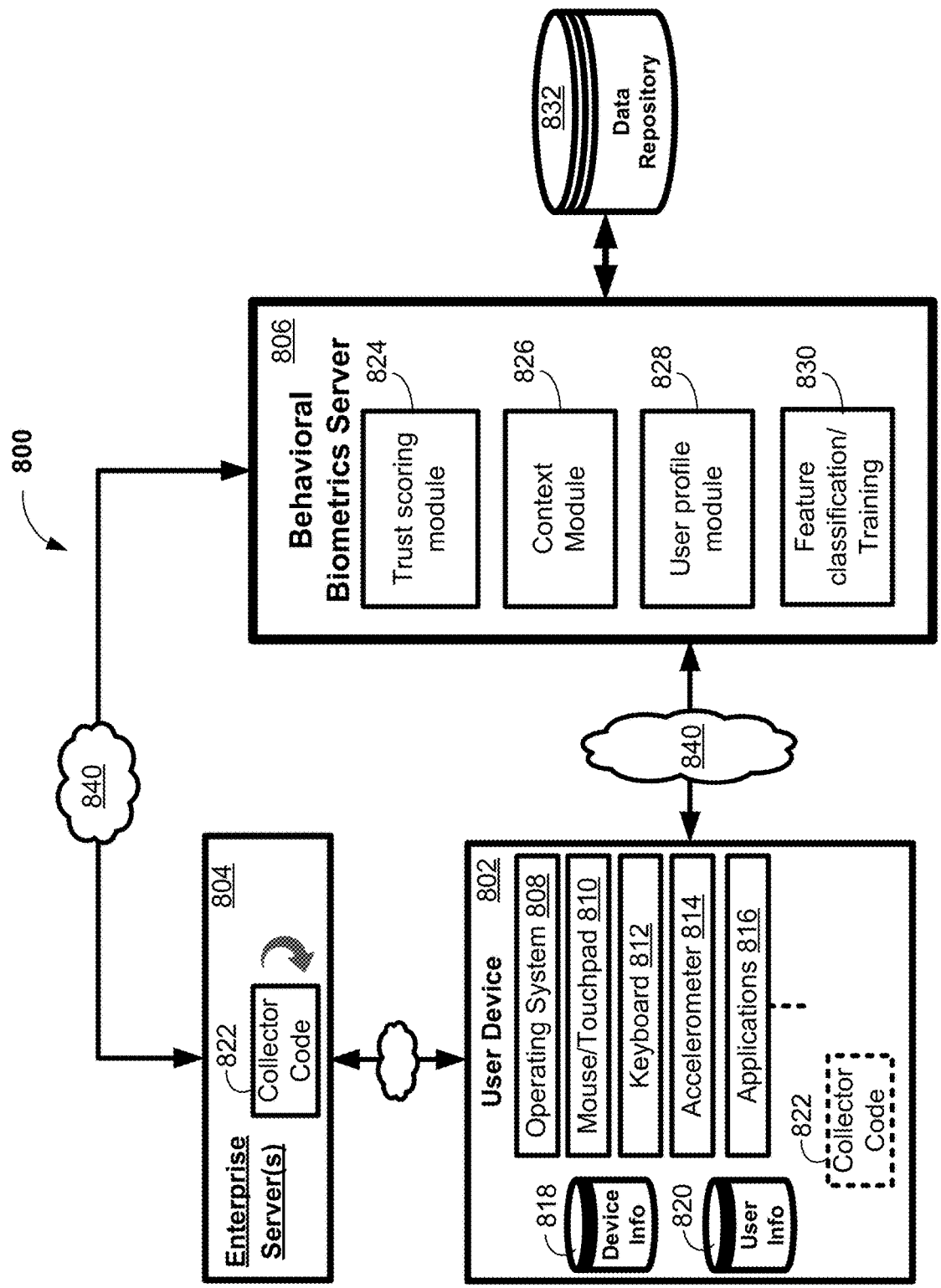
FIG. 8 is an example block diagram of a system/process, in accordance with certain exemplary implementations of the disclosed technology.

FIG. 8 is an example block diagram of a system/process, in accordance with certain exemplary implementations of the disclosed technology.

In accordance with certain exemplary implementations of the disclosed technology, collector code 822 may be utilized (on the Enterprise Server 804 and/or the user device 802) to gather contextual and/or timing interaction data between the user device 802 and the Enterprise Server 804.

In certain exemplary implementations, the user device 802 may include an operating system 808, applications 816, a mouse or touchpad 810, a keyboard 812, an accelerometer 814, etc. Certain device information 818 may be stored in the memory of the user device 802. In certain exemplary implementations, user information 820 may be stored in the memory of the user device 802. In accordance with certain exemplary implementations of the disclosed technology, and as mentioned above, the collector code 822 may (optionally) reside on the user device 802, for example, via a downloaded app that allows the user device 802 to communicate with the Enterprise Server 804. In other exemplary embodiments, the collector code 822 may reside with the Enterprise Server 804, for example, via JavaScript on a website of the Enterprise Server 804.

In certain exemplary implementations, the user device 802, the Enterprise Server 804, and/or the Behavioral Biometrics Server 806 may be in communication with one another via one or more communications channels 840 including, but not limited the Internet.

The Behavioral Biometrics Server 806 may include various modules, such as a trust scoring module 824, a context module 826, a user profile module 828, a feature classification/training module 830, etc., which may be used to enable the various functions of the Behavioral Biometrics Server 806. The trust scoring module 824, for example, may be utilized for authenticating or verifying users of the user device 802 under normal modes of communication based on behavioral and/or other interaction data captured and supplied by the collector code 822. Certain exemplary implementations of the Behavioral Biometrics Server 806 may be in communication with a data repository 832, for example, which may be used to store user, device, and/or previous behavioral and/or other interaction data.

Figure 9:
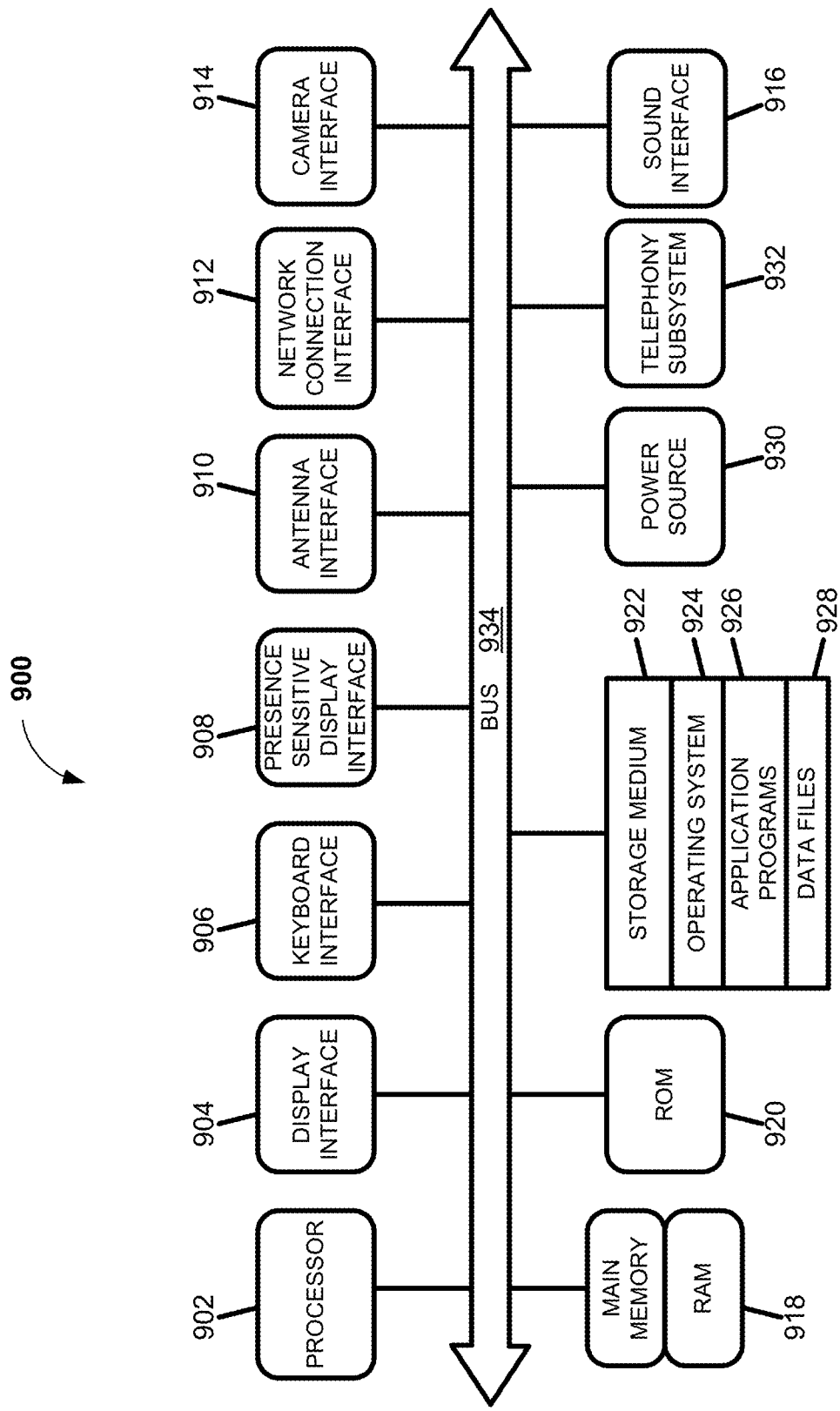
FIG. 9 is an example block diagram of a computing system, in accordance with certain exemplary implementations of the disclosed technology.

FIG. 9 depicts a block diagram of an illustrative computing device 900 that may be utilized to enable certain aspects of the disclosed technology. Various implementations and methods herein may be embodied in non-transitory computer-readable media for execution by a processor. It will be understood that the computing device 900 is provided for example purposes only and does not limit the scope of the various implementations of the communication systems and methods.

The computing device 900 of FIG. 9 includes one or more processors where computer instructions are processed. The computing device 900 may comprise the processor 902, or it may be combined with one or more additional components shown in FIG. 9. In some instances, a computing device may be a processor, controller, or central processing unit (CPU). In yet other instances, a computing device may be a set of hardware components.

The computing device 900 may include a display interface 904 that acts as a communication interface and provides functions for rendering video, graphics, images, and texts on the display. In certain example implementations of the disclosed technology, the display interface 904 may be directly connected to a local display. In another example implementation, the display interface 904 may be configured for providing data, images, and other information for an external/remote display. In certain example implementations, the display interface 904 may wirelessly communicate, for example, via a Wi-Fi channel or other available network connection interface 912 to the external/remote display.

In an example implementation, the network connection interface 912 may be configured as a communication interface and may provide functions for rendering video, graphics, images, text, other information, or any combination thereof on the display. In one example, a communication interface may include a serial port, a parallel port, a general-purpose input and output (GPIO) port, a game port, a universal serial bus (USB), a micro-USB port, a high-definition multimedia (HDMI) port, a video port, an audio port, a Bluetooth port, a near-field communication (NFC) port, another like communication interface, or any combination thereof. In one example, the display interface 904 may be operatively coupled to a local display. In another example, the display interface 904 may wirelessly communicate, for example, via the network connection interface 912 such as a Wi-Fi transceiver to the external/remote display.

The computing device 900 may include a keyboard interface 906 that provides a communication interface to a keyboard. According to certain example implementations of the disclosed technology, the presence-sensitive display interface 908 may provide a communication interface to various devices such as a pointing device, a touch screen, etc.

The computing device 900 may be configured to use an input device via one or more of the input/output interfaces (for example, the keyboard interface 906, the display interface 904, the presence-sensitive display interface 908, the network connection interface 912, camera interface 914, sound interface 916, etc.,) to allow a user to capture information into the computing device 900. The input device may include a mouse, a trackball, a directional pad, a trackpad, a touch-verified trackpad, a presence-sensitive trackpad, a presence-sensitive display, a scroll wheel, a digital camera, a digital video camera, a web camera, a microphone, a sensor, a smartcard, and the like. Additionally, the input device may be integrated with the computing device 900 or may be a separate device. For example, the input device may be an accelerometer, a magnetometer, a digital camera, a microphone, and an optical sensor.

Example implementations of the computing device 900 may include an antenna interface 910 that provides a communication interface to an antenna; a network connection interface 912 that provides a communication interface to a network. According to certain example implementations, the antenna interface 910 may utilize to communicate with a Bluetooth transceiver.

In certain implementations, a camera interface 914 may be provided that acts as a communication interface and provides functions for capturing digital images from a camera. In certain implementations, a sound interface 916 is provided as a communication interface for converting sound into electrical signals using a microphone and for converting electrical signals into sound using a speaker. According to example implementations, random-access memory (RAM) 918 is provided, where computer instructions and data may be stored in a volatile memory device for processing by the CPU 902.

According to an example implementation, the computing device 900 includes a read-only memory (ROM) 920 where invariant low-level system code or data for basic system functions such as basic input and output (I/O), startup, or reception of keystrokes from a keyboard are stored in a non-volatile memory device. According to an example implementation, the computing device 900 includes a storage medium 922 or other suitable types of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 924, application programs 926 (including, for example, a web browser application, a widget or gadget engine, and or other applications, as necessary) and data files 928 are stored. According to an example implementation, the computing device 900 includes a power source 930 that provides an appropriate alternating current (AC) or direct current (DC) to power components. According to an example implementation, the computing device 900 includes a telephony subsystem 932 that allows the device 900 to transmit and receive sound over a telephone network. The constituent devices and the CPU 902 communicate with each other over a bus 934.

In accordance with an example implementation, the CPU 902 has an appropriate structure to be a computer processor. In one arrangement, the computer CPU 902 may include more than one processing unit. The RAM 918 interfaces with the computer bus 934 to provide quick RAM storage to the CPU 902 during the execution of software programs such as the operating system application programs, and device drivers. More specifically, the CPU 902 loads computer-executable process steps from the storage medium 922 or other media into a field of the RAM 918 to execute software programs. Data may be stored in the RAM 918, where the data may be accessed by the computer CPU 902 during execution. In one example configuration, the device 900 includes at least 128 MB of RAM, and 256 MB of flash memory.

The storage medium 922 itself may include a number of physical drive units, such as a redundant array of independent disks (RAID), a floppy disk drive, a flash memory, a USB flash drive, an external hard disk drive, a thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer-readable storage media allow the device 900 to access computer-executable process steps, application programs, and the like, stored on removable and non-removable memory media, to off-load data from the device 900 or to upload data onto the device 900. A computer program product, such as one utilizing a communication system may be tangibly embodied in storage medium 922, which may comprise a machine-readable storage medium.

According to one example implementation, the term computing device, as used herein, may be a CPU, or conceptualized as a CPU (for example, the CPU 902 of FIG. 9). In this example implementation, the computing device (CPU) may be coupled, connected, and/or in communication with one or more peripheral devices.

It should also be understood by one skilled in the art that the devices depicted in FIG. 8 may be implemented on a computing device 900 such as is shown in FIG. 9.

Figure 10:
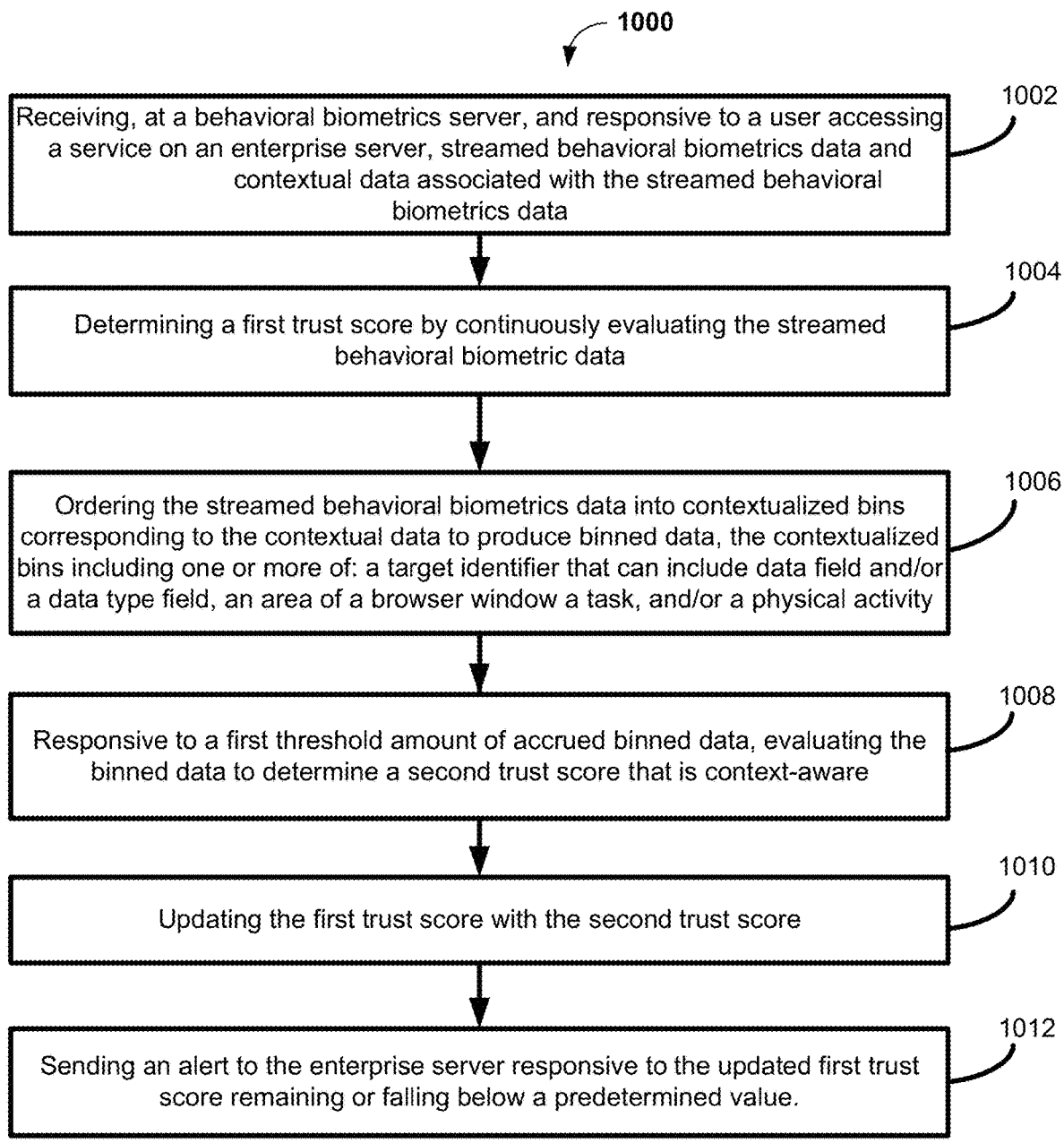
FIG. 10 is a flow diagram of a method, in accordance with certain implementations of the disclosed technology.

FIG. 10 is a flow diagram of a method, in accordance with certain implementations of the disclosed technology. In block 1002, the method 1000 includes receiving, at a behavioral biometrics server, and responsive to a user accessing a service on an enterprise server, streamed behavioral biometrics data, and contextual data associated with the streamed behavioral biometrics data. In block 1004, the method 1000 includes determining a first trust score by evaluating the streamed behavioral biometric data. In block 1006, if the first trust score is below a first predetermined value, the method 1000 includes separating the streamed behavioral biometrics data into contextualized bins corresponding to the contextual data to produce binned data, the contextualized bins include one or more of: target identifiers that can include a data field, and/or a data type field, an area of a browser window a task, and/or a physical activity. In block 1008, the method 1000 includes, evaluating the binned data to determine a second trust score that is context-aware responsive to a first threshold amount of accrued binned data. In block 1010, the method 1000 includes sending an alert to the enterprise server responsive to the second trust score being below a second predetermined value.

In certain exemplary implementations, the first threshold amount of accrued binned data can include a predetermined number or amount of behavioral biometrics data that is collected and ordered into one or more of the contextualized bins.

In certain exemplary implementations, one or more of the first trust score and the second trust score may be continuously determined by continuously evaluating the streamed behavioral biometric data.

In certain exemplary implementations, the first threshold amount of accrued binned data may be calculated as a weighted average of a confidence level corresponding to keystroke activity matching a user profile for the associated context.

In some implementations, the first trust score may be updated only when the streamed behavioral biometrics data includes predetermined contextual data.

Certain exemplary implementations of the disclosed technology can include prompting the user to provide a specific field data input when the first trust score is below a predetermined value for a certain time period.

In certain exemplary implementations, the first predetermined value and the second predetermined value may be the same value.

In accordance with certain exemplary implementations of the disclosed technology, the streamed behavioral biometrics data can include user interaction event timing data.

In certain exemplary implementations, the user interaction event timing data can include one or more of keystroke data, mouse data, touchscreen data, and sensor data. The keystroke data include one or more of keypress timings, timings between keypresses, bigram timings, number of pauses during keypress entry, and length of pauses during keypress entry.

In certain exemplary implementations, the data field can include one or more of an email address, a first name, a last name, a phone number, an International Bank Account Number (IBAN), a comment field, and a navigation bar.

In certain exemplary implementations, the data type field can include or be associated with one of more of a free text field, a static field, a customer name field, and a password field.

In certain exemplary implementations of the disclosed technology, the service may be performed using a browser of a user device. In certain exemplary implementations, the service can be performed by one or more of a webpage or a web app.

In certain exemplary implementations, a collector code residing on the enterprise server may capture the streamed behavioral biometrics data. In certain exemplary implementations, the collector code may be implemented in JavaScript on the enterprise server. In some applications, the collector code may be implemented using an SDK on the enterprise server.

In certain exemplary implementations, a first general mode of collecting and scoring streamed keystroke data may be complemented with a second mode of collecting and scoring keystroke data of one or more such contextualized bins, such that keystrokes may be split into one bin for each target identifier and ordered into lists of successive keystrokes. A target identifier, for example, can be a name of a data field (including but not limited to email address, first name, last name, phone number, IBAN number, comment field, navigation bar, etc.) or a type of a data field (free text field, static field, customer name field, etc.). In certain exemplary implementations, such target or type of data may be considered as context.

In accordance with certain exemplary implementations of the disclosed technology, the first general mode may be run continuously on all available data to provide a first behavioral score with some time filtering parameters to set the overall user trust value. In parallel, the second mode may be utilized to categorize data into contextualized bins, and when a sufficient amount of contextualized data has been accrued, certain implementations may calculate a second context-aware behavioral score, which may be used to update or replace an initial trust score with this second context-aware behavioral score. In certain exemplary implementations, more confidence can be placed in this second contextualized version of the scoring than in the first mode behavioral scoring. In certain exemplary implementations, the second score may only be available at specific time points, depending on system configuration, user tasks, etc.

In some embodiment, a test for determining whether a sufficient amount of contextualized data has been accrued may be calculated based on a threshold and/or on based a predetermined number of characters available in that context. In another embodiment, such a test may be calculated as a weighted average of a confidence level of how well the keystrokes match a profile in that context. In certain exemplary implementations, the trust value may be computed when certain contexts are present. In another implementation, the user may be prompted to provide a specific field data input, such as a name or an email address, when the trust level is below a threshold for a certain time period. In certain exemplary implementations, the ordering and contextualization may occur at the user device 802 and/or the Enterprise Server 804 in which the collector code 822 is implemented.

In certain exemplary implementations, context and ordering of behavioral data may be restored to help improve one-shot behavioral algorithms, such as those used in classical banking application scenarios. Certain exemplary implementations of the disclosed technology may utilize such a restoration feature to enable such algorithms to perform sufficiently well in a streamed, all-continuous trust evaluation scenario.

Figure 11:
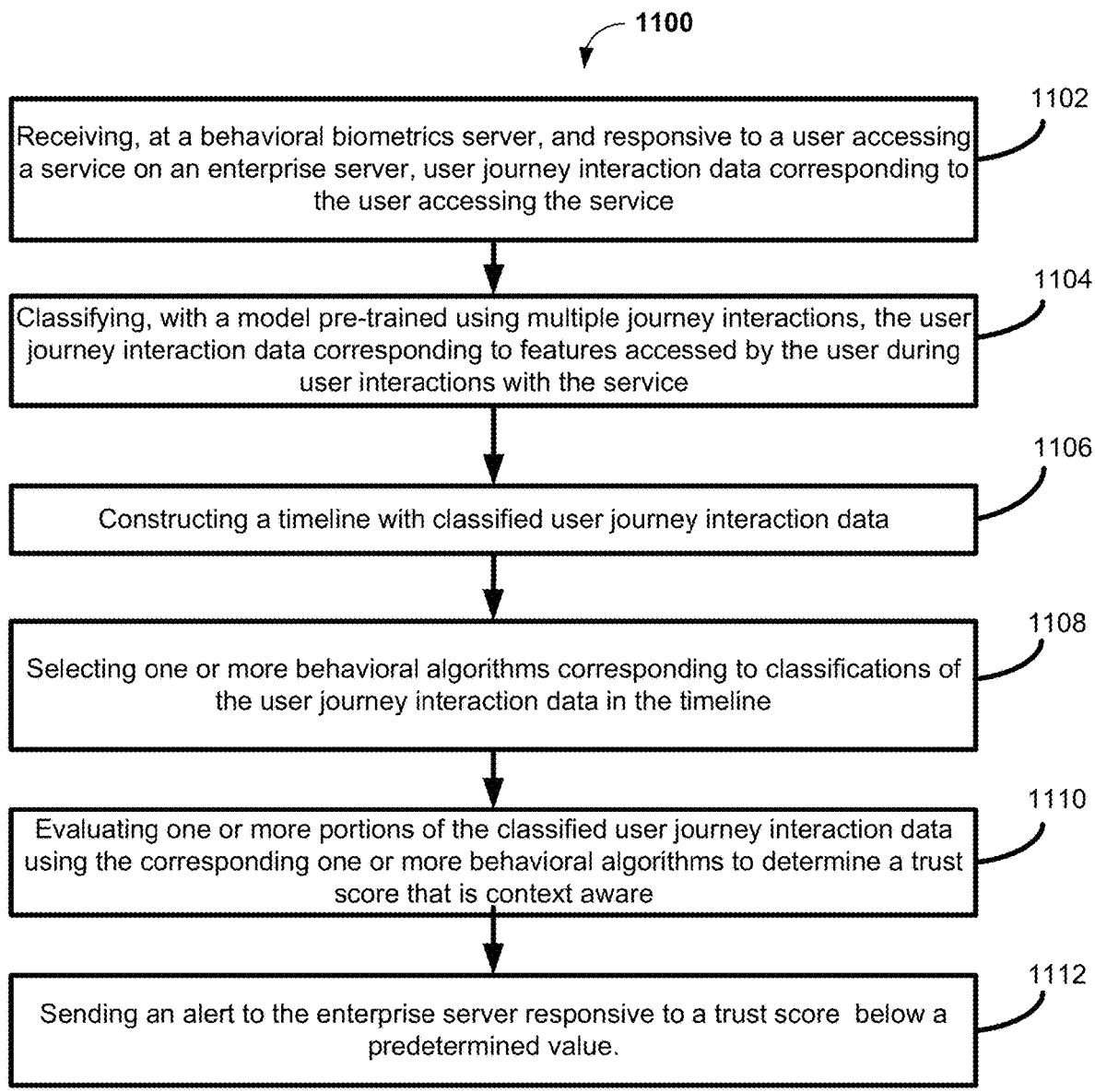
FIG. 11 is a flow diagram of a method, in accordance with certain implementations of the disclosed technology.

FIG. 11 is a flow diagram of a method for improving behavioral biometrics scoring accuracy using contextualized user journey segments, in accordance with certain implementations of the disclosed technology. In block 1102, the method 1100 includes receiving, at a behavioral biometrics server, and responsive to a user accessing a service on an enterprise server, user journey interaction data corresponding to the user accessing the service. In block 1104, the method 1100 includes classifying, with a model pre-trained using multiple journey interactions, the user journey interaction data corresponding to features accessed by the user during user interactions with the service. In block 1106, the method 1100 includes constructing a timeline with classified user journey interaction data. In block 1108, the method 1100 includes, selecting one or more behavioral algorithms corresponding to classifications of the user journey interaction data in the timeline. In block 1110, the method 1100 includes evaluating one or more portions of the classified user journey interaction data using the corresponding one or more behavioral algorithms to determine a trust score that is context aware. In block 1112, the method 1100 sending an alert to the enterprise server responsive to the trust score being below a predetermined value.

In certain exemplary implementations, the user journeys may be classified in a pre-deployment analysis phase.

In certain exemplary implementations, a behaviometric algorithm may be selected according to a particular segment of the user journey.

In certain exemplary implementations, events related to user interactions with the pages (such as typing, scrolling, swiping, submitting, etc.,) may be stored as fixed length time-series.

In certain exemplary implementations, the adaptation of the algorithms may be facilitated by the detection and matching of one or more of events and/or processes relating to navigating or interacting with different web pages that are common for users performing user journeys. In certain exemplary implementations, an existing pre-trained template may be utilized to define steps taken in the user journeys.

Implementations of the subject matter and the functional operations described herein may be implemented in various systems, digital electronic circuitry, computer software, firmware, or hardware, including the structures disclosed herein and their structural equivalents, or in combinations of one or more of them. Implementations of the subject matter described herein can be implemented as one or more computer program products, i.e., one or more modules of computer program instructions encoded on a tangible and non-transitory computer-readable medium for execution by, or to control the operation of, data processing apparatus. The computer-readable medium can be a machine-readable storage device, a machine-readable storage substrate, a memory device, a composition of matter affecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or another unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flow described in this specification can be performed by one or more programmable processors executing one or more computer programs to perform functions by operating on input data and generating output. The processes and logic flows can also be performed by, and apparatus can also be implemented as, special purpose logic circuitry, e.g., FPGA (field programmable gate array) or ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media, and memory devices, including by way of example semiconductor memory devices, e.g., EPROM, EEPROM, flash memory devices. The processor and the memory can be supplemented by, or incorporated into, special-purpose logic circuitry.

While this disclosure includes many specifics, these should not be construed as limitations on the scope of any invention or of what may be claimed, but rather as descriptions of features that may be specific to particular embodiments of particular inventions. Certain features that are described in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described herein should not be understood as requiring such separation in all embodiments.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods and apparatuses described hereinabove are also contemplated and within the scope of the disclosed technology.

We claim:

1. A computer-implemented method for improving behavioral biometrics scoring accuracy using streamed data, the method comprising:
   receiving, at a behavioral biometrics server, and responsive to a user accessing a service on an enterprise server:
      streamed behavioral biometrics data; and
      contextual data associated with the streamed behavioral biometrics data;
   determining a first trust score by evaluating the streamed behavioral biometrics data;
   if the first trust score is below a first predetermined value:
      separating the streamed behavioral biometrics data into contextualized bins corresponding to the contextual data to produce binned data, the contextualized bins comprising one or more of:
         a target identifier;
         a data field;
         a data type field;
         an area of a browser window;
         a task; and
         a physical activity;
      responsive to a first threshold amount of accrued binned data, evaluating the binned data to determine a second trust score that is context-aware; and
   sending an alert to the enterprise server responsive to the second trust score being below a second predetermined value.

2. The method of claim 1, wherein the first threshold amount of accrued binned data comprises a predetermined number of the streamed behavioral biometrics data that is collected and ordered into one or more of the contextualized bins.

3. The method of claim 1, wherein the first threshold amount of accrued binned data is calculated as a weighted average of a confidence level corresponding to keystroke activity matching a user profile for the contextual data.

4. The method of claim 1, wherein the first predetermined value and the second predetermined value are the same value.

5. The method of claim 1, further comprising prompting the user to provide a specific field data input when the first trust score is below the first predetermined value for a-first time period.

6. The method of claim 1, wherein the first trust score is continuously determined by continuously evaluating the streamed behavioral biometrics data.

7. The method of claim 1, wherein the streamed behavioral biometrics data comprises user interaction event timing data comprising one or more of keystroke data, mouse data, touchscreen data, and sensor data.

8. The method of claim 7, wherein the keystroke data comprises one or more of keypress timings, timings between keypresses, bigram timings, number of pauses during keypress entry, and length of pauses during keypress entry.

9. The method of claim 1, wherein the data field comprises one or more of an email address, a first name, a last name, a phone numbers, an International Bank Account Number (IBAN), a comment field, and a navigation bar.

10. The method of claim 1, wherein the data type field comprises one of more of a free text field, a static field, a customer name field, and a password field.

11. The method of claim 1, wherein the user accessing the service is performed using a browser of a user device.

12. The method of claim 1, wherein the service comprises one or more of a webpage or a web app.

13. The method of claim 1, wherein a collector code residing on the enterprise server captures the streamed behavioral biometrics data.

14. The method of claim 13, wherein the collector code is implemented in JavaScript on the enterprise server.

15. The method of claim 13, wherein the collector code is implemented in an application SDK on the enterprise server.

16. A system for improving behavioral biometrics scoring accuracy using streamed data, the system comprising:
   a processor; and
   a memory having programming instructions stored thereon, which, when executed by the processor, cause the processor to:
      receive, at a behavioral biometrics server, and responsive to a user accessing a service on an enterprise server:
         streamed behavioral biometrics data; and
         contextual data associated with the streamed behavioral biometrics data;
      determine a first trust score by evaluating the streamed behavioral biometrics data;
      if the first trust score is below a predetermined value:
         separating the streamed behavioral biometrics data into contextualized bins corresponding to the contextual data to produce binned data, the contextualized bins comprising one or more of:
            a target identifier;
            a data field;
            a data type field;
            an area of a browser window;
            a task; and a physical activity;
responsive to a first threshold amount of accrued binned data, evaluate the binned data to determine a second trust score that is context-aware; and
send an alert to the enterprise server responsive to the second trust score being below a second predetermined value.

17. The method of claim 1, further comprising prompting the user to provide a specific field data input when the first trust score is below the first predetermined value for a first time period.

18. The method of claim 1, wherein the streamed behavioral biometrics data comprises user interaction event timing data.

19. The system of claim 16, wherein the first threshold amount of accrued binned data comprises a predetermined number of the streamed behavioral biometrics data that is collected and ordered into one or more of the contextualized bins.

* * * * *